(12) United States Patent
Rahnama-Moghaddam et al.

(10) Patent No.: US 11,443,045 B2
(45) Date of Patent: Sep. 13, 2022

(54) METHODS AND SYSTEMS FOR EXPLAINING A DECISION PROCESS OF A MACHINE LEARNING MODEL

(71) Applicant: Booz Allen Hamilton Inc., McLean, VA (US)

(72) Inventors: Arash Rahnama-Moghaddam, Fairfax, VA (US); Andrew Tseng, Greenbelt, MD (US)

(73) Assignee: BOOZ ALLEN HAMILTON INC., McLean, VA (US)

( * ) Notice: Subject to any disclaimer, the term of this patent is extended or adjusted under 35 U.S.C. 154(b) by 331 days.

(21) Appl. No.: 16/866,997

(22) Filed: May 5, 2020

(65) Prior Publication Data

US 2021/0350004 A1 Nov. 11, 2021

(51) Int. Cl.
*G06F 21/57* (2013.01)
*G06N 20/00* (2019.01)
*G06F 16/23* (2019.01)

(52) U.S. Cl.
CPC ........ *G06F 21/577* (2013.01); *G06F 16/2358* (2019.01); *G06N 20/00* (2019.01); *G06F 2221/034* (2013.01)

(58) Field of Classification Search
CPC ............... G06F 21/577; G06F 16/2358; G06F 2221/034; G06F 21/552; G06N 20/00
See application file for complete search history.

(56) References Cited

U.S. PATENT DOCUMENTS 10,453,165 B1 * 10/2019 Kostov .................. G06V 10/40
10,783,401 B1 * 9/2020 Jiang ...................... G06V 20/49
(Continued)

FOREIGN PATENT DOCUMENTS

CN 107491691 A * 12/2017 ............. G06F 21/53
CN 110546608 A * 12/2019 ............. G06F 3/048
(Continued)

OTHER PUBLICATIONS

Hassan, Muhammad, Integrating single-shot Fast Gradient Sign Method (FGSM) with classical image processing techniques for generating adversarial attacks on deep learning classifiers, Event: Fourteenth International Conference on Machine Vision (ICMV 2021), 2021, Rome, Italy, 13 pages (Year: 2021).*
(Continued)

*Primary Examiner* — Shahriar Zarrineh
(74) *Attorney, Agent, or Firm* — Buchanan Ingersoll & Rooney PC

(57) ABSTRACT

A method and system for explaining a decision process of a machine learning model that includes inputting into a machine learning model a first input data file; receiving a first output data file from the machine learning model based on the first input data file; executing an adversarial attack on the machine learning model, creating a mapping of the one or more units of data of the first input data file with changes by the adversarial attack exceeding a first threshold to one or more segments of the first input data file; determining a density of the changes to the one or more units of data in each of the one or more segments; and displaying the one or more segments of the first input data file having a density of changes to the one or more units of data exceeding a second threshold via a graphical user interface.

15 Claims, 3 Drawing Sheets

(56) References Cited

U.S. PATENT DOCUMENTS

| | | | |
|---|---|---|---|
| 10,791,323 B2* | 9/2020 | Wuolijoki | G06T 5/002 |
| 10,936,910 B2* | 3/2021 | Zhang | G06V 10/82 |
| 10,944,767 B2* | 3/2021 | Goswami | G06N 3/08 |
| 10,963,704 B2* | 3/2021 | Glaser | G06Q 20/202 |
| 11,042,799 B2* | 6/2021 | Goswami | G06F 9/3867 |
| 11,164,085 B2* | 11/2021 | Rahnama Moghaddam | G06N 3/084 |
| 11,227,215 B2* | 1/2022 | Liu | G06N 20/00 |
| 11,228,603 B1* | 1/2022 | Anand | G06N 7/005 |
| 2013/0198119 A1* | 8/2013 | Eberhardt, III | G06N 20/00 706/12 |
| 2015/0254555 A1* | 9/2015 | Williams, Jr. | G06N 3/084 706/14 |
| 2018/0196942 A1* | 7/2018 | Kashyap | G06F 21/561 |
| 2018/0322584 A1* | 11/2018 | Crabtree | G06N 5/022 |
| 2019/0130110 A1* | 5/2019 | Lee | G06F 21/57 |
| 2019/0171187 A1* | 6/2019 | Cella | G06N 3/086 |
| 2020/0036681 A1* | 1/2020 | Komashinskiy | G06N 20/00 |
| 2020/0057857 A1* | 2/2020 | Roytman | G06N 20/00 |
| 2020/0104412 A1* | 4/2020 | Bart | G16H 10/60 |
| 2020/0167677 A1* | 5/2020 | Verma | G06N 5/003 |
| 2020/0285952 A1* | 9/2020 | Liu | G06N 3/08 |
| 2020/0389470 A1* | 12/2020 | Kursun | H04L 63/1416 |
| 2020/0410335 A1* | 12/2020 | Gu | G06N 3/08 |
| 2021/0201195 A1* | 7/2021 | Vengertsev | G06K 9/6267 |
| 2021/0312811 A1* | 10/2021 | Ohlarik | G06N 20/00 |

FOREIGN PATENT DOCUMENTS

| | | | | |
|---|---|---|---|---|
| CN | 113014529 A | * | 6/2021 | |
| CN | 113508066 A | * | 10/2021 | G05D 1/0088 |
| CN | 110837527 B | * | 3/2022 | G06F 16/2462 |
| DE | 202020101701 U1 | * | 8/2020 | G06K 9/6256 |
| JP | 2020510856 A | * | 4/2020 | |

OTHER PUBLICATIONS

Xingjun Ma, Understanding adversarial attacks on deep learning based medical image analysis systems, State Key Laboratory of VR Technology and Systems, School of Computer Science and Engineering, Beihang University, Beijing, China, Received Jul. 18, 2019, 11 pages (Year: 2019).*

Olakunle Ibitoye, Analyzing Adversarial Attacks Against Deep Learning for Intrusion Detection in IoT Networks, School of Information Technology Carleton University, Ottawa, Canada, 6 pages (Year: 2019).*

Naveed Akhtar, Threat of Adversarial Attacks on Deep Learning in Computer Vision: A Survey, Department of Computer Science and Software Engineering, The University of Western Australia, Crawley, WA 6009, Australia, Received Jan. 4, 2018,, 21 pages (Year: 2018).*

Mesut Ozdag, Adversarial Attacks and Defenses Against Deep Neural Networks: A Survey, Complex Adaptive Systems Conference with Theme: Cyber Physical Systems and Deep Learning, CAS 2018, Nov. 5-Nov. 7, 2018, Chicago, Illinois, USA, 10 pages (Year: 2018).*

* cited by examiner

METHODS AND SYSTEMS FOR EXPLAINING A DECISION PROCESS OF A MACHINE LEARNING MODEL

TECHNICAL FIELD

The present disclosure generally relates to methods and systems for explainability of artificial intelligence systems, specifically explaining a decision process of a machine learning model.

BACKGROUND

Deep learning is the main force behind the recent rise in artificial intelligence (AI) solutions. Deep learning algorithms are capable of producing a performance on par with, if not exceeding, human performance in tasks such as classification, regression, and prediction in fields such as computer vision, natural language processing, and voice recognition. In the early days of AI systems, the results and output were easily interpretable and understandable to humans. However, over the last few years, there has been a rise in opaque AI decision systems such as Deep Neural Networks (DNNs), which can comprise hundreds of layers and millions of parameters. Thus, such AI decision systems have become known as black-box models. The opaqueness of such black-box models provides a significant barrier to detecting when such models are in error, and understanding the source of the errors, which can inhibit the ability to impose corrective actions. Further, the opaqueness of black-box models presents the danger of creating or relying on decisions that are not justifiable or legitimate. Thus, there is a need for a technical solution for explaining how AI systems make decisions.

SUMMARY

A method for explaining a decision process of a machine learning model is disclosed. The method includes inputting into a machine learning model a first input data file, the first input data file having one or more units of data; receiving a first output data file from the machine learning model based on the first input data file, wherein the first output data file has a first output determined by a decision process of the machine learning model; executing an adversarial attack on the machine learning model, the adversarial attack generating one or more second input data files and inputting the one or more second input data files into the machine learning model to produce one or more second output data files, wherein the adversarial attack changes one or more units of data of the first input data file to generate the one more second input data files; creating a first mapping of the one or more units of data of the first input data file changed by the adversarial attack to generate the one more second input data files; determining whether the changes to the one or more units of data of the first input data file to generate the one more second input data files exceeds a first threshold; segmenting the one or more units of data of the first input data file into one or more segments based on one or more characteristics of the first input data file; creating a second mapping of the one or more units of data of the first input data file with changes exceeding the first threshold to the one or more segments of the first input data file; determining a density of the changes to the one or more units of data in each of the one or more segments of the first input data file in the second mapping; and displaying the one or more segments of the first input data file having a density of changes to the one or more units of data exceeding a second threshold via a graphical user interface. For example, the first input data file could be an image file and the machine learning model could be an image classification model.

A system for identifying the decision process of a machine learning model. The system includes a processor configured to input into a machine learning model a first input data file, the first input data file having one or more units of data; the processor configured to receive a first output data file from the machine learning model based on the first input data file, wherein the first output data file has a first output determined by a decision process of the machine learning model; an attack module configured to execute an adversarial attack on the machine learning model, the adversarial attack generating one or more second input data files and inputting the one or more second input data files into the machine learning model to produce one or more second output data files, wherein the adversarial attack changes one or more units of data of the first input data file to generate the one more second input data files; a first mapping module configured to create a first mapping of the one or more units of data of the first input data file changed by the adversarial attack to generate the one more second input data files; an attack determination module configured to determine whether the changes to the one or more units of data of the first input data file to generate the one more second input data files exceed a first threshold; a segmentation module configured to segment the one or more units of data of the first input data file into one or more segments based on one or more characteristics of the first input data file; a second mapping module configured to create a second mapping of the one or more units of data of the first input data file with changes exceeding the first threshold to the one or more segments of the first input data file; a density determination module configured to determine a density of the changes to the one or more units of data in each of the one or more segments of the first input data file in the second mapping; and a display module configured to display the one or more segments of the first input data file having a density of changes to the one or more units of data exceeding a second threshold via a graphical user interface.

A computer program product for identifying the decision process of a machine learning model. The computer program product including a computer-readable storage medium having program instructions embodied therewith, the program instructions executable by a computer to cause the computer to perform a method including inputting into a machine learning model a first input data file, the first input data file having one or more units of data; receiving a first output data file from the machine learning model based on the first input data file, wherein the first output data file has a first output determined by a decision process of the machine learning model; executing an adversarial attack on the machine learning model, the adversarial attack generating one or more second input data files and inputting the one or more second input data files into the machine learning model to produce one or more second output data files, wherein the adversarial attack changes one or more units of data of the first input data file to generate the one more second input data files; creating a first mapping of the one or more units of data of the first input data file changed by the adversarial attack to generate the one more second input data files; determining whether the changes to the one or more units of data of the first input data file to generate the one more second input data files exceeds a first threshold; segmenting the one or more units of data of the first input data file into one or more segments based on one or more characteristics of the first input data file; creating a second mapping of the one or more units of data of the first input data file with changes exceeding the first threshold to the one or more segments of the first input data file; determining a density of the changes to the one or more units of data in each of the one or more segments of the first input data file in the second mapping; and displaying the one or more segments of the first input data file having a density of changes to the one or more units of data exceeding a second threshold via a graphical user interface.

BRIEF DESCRIPTION OF THE DRAWINGS

The scope of the present disclosure is best understood from the following detailed description of exemplary embodiments when read in conjunction with the accompanying drawings, wherein.

Figure 1A:
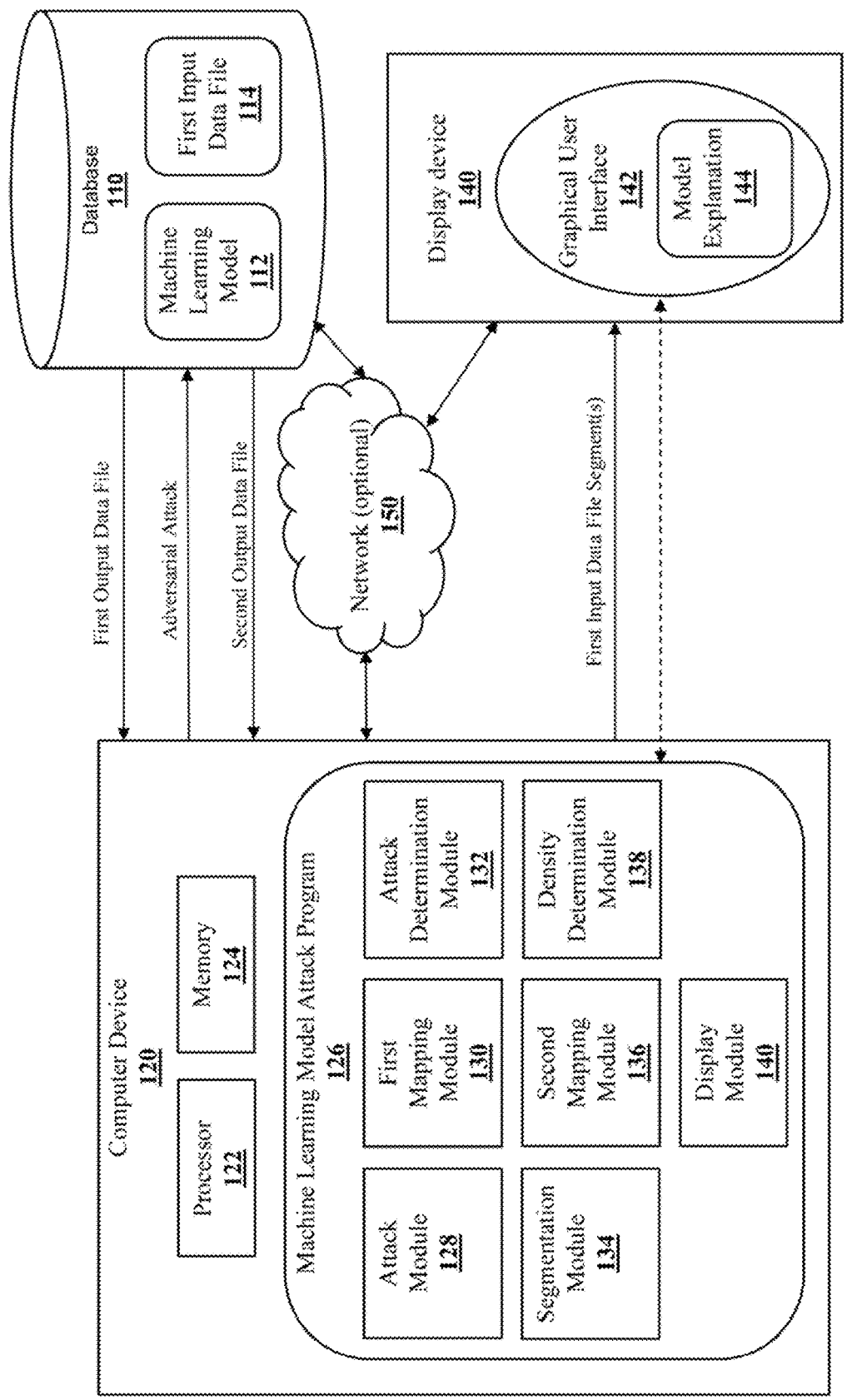
FIG. 1a is a block diagram illustrating a system for explaining a decision process of a machine learning model in accordance with exemplary embodiments.

Further areas of applicability of the present disclosure will become apparent from the following detailed description. It should be understood that the detailed descriptions of exemplary embodiments are intended for illustration purposes only and are not intended to limit the scope of the disclosure.

DETAILED DESCRIPTION

The present disclosure provides a novel machine learning model decision process explainability solution. Currently, explaining the decisions and predictions made by machine learning models (AI systems) in human terms is a key challenge—due to the high complexity of the models, as well as the potential implications on human interests, rights, and lives. While Explainable AI is an emerging field of research, there is currently no concrete explainability solution that can be efficiently applied to machine learning models across different applications. In current technology, explainable AI models have many hyper-parameters that a user must fine tune before the explainable AI model can work for a specific application. Thus, in current AI explainability models, users end up spending significant time using trial and error to get the best explainable results. The methods and systems herein provide a novel solution, not addressed by current technology, by introducing a new approach for efficiently explaining how a machine learning model makes its decisions and/or predictions in a given task. Exemplary embodiments of the methods and systems provided herein utilize adversarial attacks to characterize and quantify the important factors of a given input affecting the decision-making process of a machine learning model. Thus, the methods and systems provided herein provide a novel framework that can explain the decisions made by a machine learning model in human understandable form.

FIG. 1 illustrates an exemplary system 100 for explaining a decision process of a machine learning model in accordance with exemplary embodiments. The system 100 includes a database 110, a computer device 120, a display device 140, and a network 150. While the database 110, the computer device 120, and the display device 140 are illustrated as separate devices connected by the network 150, it can be appreciated that the database 110, the computer device 120, and the display device 140, or any combination thereof, may be contained within a single device or multiple devices, and communicate with or without the network 150.

The database 110 includes, for example, a machine learning model 112 and a first input data file 114. The database 110 can be any suitable database configuration, such as a relational database, a structured query language (SQL) database, a distributed database, or an object database, etc. Suitable configurations and storage types will be apparent to persons having skill in the relevant. While the database 110 is illustrated separate from the computer device 120, it can be appreciated that the database 110 can be a part of the computer device 120. The machine learning model 112 and the first input data file 114 will be discussed in further detail below with reference to FIGS. 1b and 2.

The computer device 120 includes, for example, a processor 122, a memory 124, and a machine learning model attack program 126. The computer device 120 may be a desktop computer, a notebook, a laptop computer, a tablet computer, a handheld device, a smart-phone, a thin client, or any other electronic device or computing system capable of storing compiling and organizing audio, visual, or textual data and receiving and sending that data to and from other computing devices, such as the database 110, and the display device 140.

The processor 122 may be a special purpose or a general purpose processor device specifically configured to perform the functions discussed herein. The processor 122 unit or device as discussed herein may be a single processor, a plurality of processors, or combinations thereof. Processor devices may have one or more processor "cores." In an exemplary embodiment, the processor 122 is configured to perform the functions associated with the modules of the machine learning model attack program 126 as discussed below with reference to FIG. 2.

The memory 124 can be a random access memory, read-only memory, or any other known memory configurations. Further, the memory 124 can include one or more additional memories including the database 110 in some embodiments. The memory and the one or more additional memories can be read from and/or written to in a well-known manner. In an embodiment, the memory and the one or more additional memories can be non-transitory computer readable recording media. Memory semiconductors (e.g., DRAMs, etc.) can be means for providing software to the computing device such as the machine learning model attack program 126. Computer programs, e.g., computer control logic, can be stored in the memory 124.

The machine learning model attack program 126 can include attack module 128, first mapping module 130, attack determination module 132, segmentation module 134, second mapping module 136, density determination module 138, and display module 140. The machine learning model attack program 126 is a computer program specifically programmed to implement the methods and functions disclosed herein for explaining a decision process of a machine learning model such as the machine learning model 112. The machine learning model attack program 126 and the modules 128-140 are discussed in more detail below with reference with FIG. 2.

The display device 140 can include the graphical user interface 142. The display device 140 can be any computing device capable of receiving display signals from another computing device, such as the computer device 120, and outputting those display signals to a display unit such as, but not limited to, a LCD screen, plasma screen, LED screen, DLP screen, CRT screen, etc. While the display device 140 is illustrated separate from the computer device 120, it can be appreciated that the display device 140 can be a part of the computer device 120.

The graphical user interface 142 can include components used to receive input from the computer device 120 and/or the display device 140 and transmit the input to the machine learning model attack program 126, or conversely to receive information from the machine learning model attack program 126 and display the information on the display device 140. In an example embodiment, the graphical user interface 142 uses a combination of technologies and devices, such as device drivers, to provide a platform to enable users of computer device 120 and/or the display device 140 to interact with the machine learning model attack program 126. In the example embodiment, the graphical user interface 142 receives input from a physical input device, such as a keyboard, mouse, touchpad, touchscreen, camera, microphone, etc. In an exemplary embodiment, the graphical user interface 142 may display a model explanation 144, which can be the segments of the first input data file 114 with density changes exceeding a threshold.

The network 150 may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. In general, the network 150 can be any combinations of connections and protocols that will support communications among the database 110, the computer device 120, and the display device 150. In some embodiments, the network 150 may be optional based on the configuration of the database 110, the computer device 120, and the display device 140.

Figure 2:
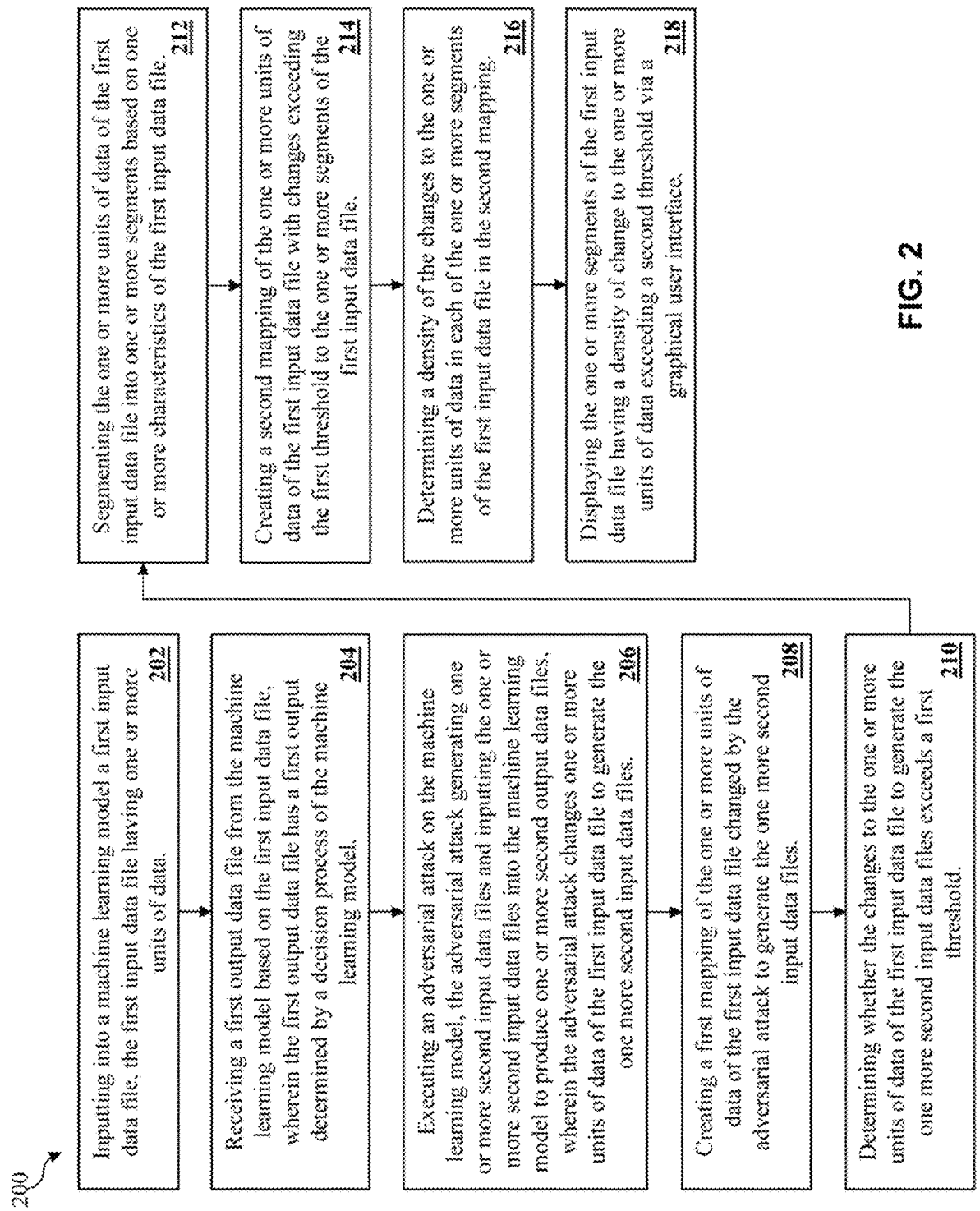
FIG. 2 illustrates a flowchart of an exemplary method for explaining a decision process of a machine learning model in accordance with exemplary embodiments.

FIG. 2 illustrates a flowchart of an exemplary method 200 for explaining a decision process of a machine learning model in accordance with exemplary embodiments.

Figure 1B:
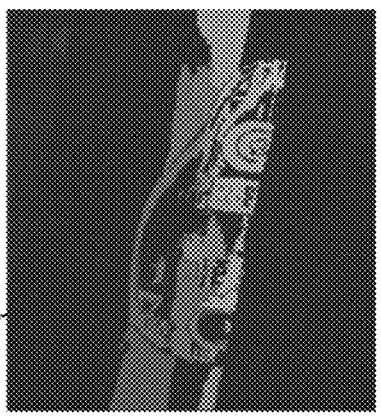
FIG. 1b illustrates an example first input data file in accordance with exemplary embodiments.

In an exemplary embodiment, the method 200 can include block 202 of inputting a first input data file 114 into a machine learning model 112. The first input data file 114 can be any type of data which can be input into the machine learning model 112, such as, but not limited to, image data, textual data, audio data, or tabular data, etc. The first input data file 114 can have one or more units of data such as, but not limited to, pixels, textual segments (e.g., words, letters, etc.), wave forms, video frames, etc. For example, the first input data file 114 may be an image data file as illustrated in FIG. 1b which can have a plurality of pixels. The machine learning model 112 can be any type of machine learning model, including, but not limited to, an artificial neural network (ANN) model (e.g., a deep neural network (DNN), a convolutional deep neural network (CNN), a recurrent neural network (RNN), etc.), a computer vision model, a natural language processing model, a decision tree model, a support vector machine model, a regression analysis model, a Bayesian network model, or a genetic algorithm model, etc. In an exemplary embodiment, the machine learning model 112 can be an image classification model such as, but not limited to, a ResNet-34 model trained on an ImageNet dataset.

In an exemplary embodiment, the method 200 can include block 204 for receiving a first output data file from the machine learning model 112 based on the first input data file 114. The first output data file can be the first input data file 114 with a first output determined by a decision process of the machine learning model 112. For example, the first output data file may be the first input data file 114 illustrated in FIG. 1b with a classification of "race car" as determined by an image classification model, e.g., the machine learning model 112.

In an exemplary embodiment, the method 200 can include block 206 for executing an adversarial attack on the machine learning model 112. Adversarial attacks manipulate features, e.g. the one or more data units, of a data file, e.g. the first input data file 114, which can affect the decisions made by a machine learning model, e.g. the machine learning model 112. In an exemplary embodiment, the adversarial attack can be a fast gradient sign method (FGSM) attack. The adversarial attack can generate one or more second input data files based on the first input data file 114, and input the one or more second input data files into the machine learning model 112 to produce one or more second output data files. For example, the adversarial attack may change one or more pixels of the first input data file 114 to generate one or more second input data files, which, to a human eye may be imperceptibly different from the first data input file 114. However, the one or more second input data files can cause the machine learning model 112 to classify the one or more second input data files as something different than the first input data file 114. For example, the adversarial attack may change one or more pixels of the first input data file 114 illustrated in FIG. 1b to generate one or more second input data files that look exactly like the race car of FIG. 1b to the human eye, but which the machine learning model 112 may classify as something other than a "race car." In other exemplary embodiments, the adversarial attack can be a projected gradient descent method (PGDM) attack, Limited Memory Broyden-Fletcher-Goldfarb-Shanno (L-BFGS) attack, a Basic Iterative Method (BIM) attack, an Iterative Least-Likely Class Method (ILLC) attack, a Jacobian-based Saliency Map Attack (JSMA), a DeepFool attack, a Compositional pattern-producing network-encoded evolutionary algorithm (CPPN EA) attack, a Carlini and Wagner's attack, a Zeroth Order Optimization (ZOO) attack, a universal perturbation attack, a one pixel attack, a feature adversary attack, a hot/cold attack, a natural generative adversarial network (Natural GAN) attack, a Model-based ensembling attack, or a ground-truth attack, etc. In an exemplary embodiment of the system 100, the attack module 128 can be configured to execute the method of block 206.

In an exemplary embodiment, the method 200 can include block 208 for creating a first mapping 150 of the one or more units of data of the first input data file 114 changed by the adversarial attack to generate the one more second input data files. The first mapping 150 may indicate an attack intensity, e.g., a magnitude, of change caused by the adversarial attack of the one or more units of the first input data file 114. For example, with reference to FIG. 1c, the first mapping 150 may indicate pixels changed, i.e., attacked, by the adversarial attack using "Xs" where the size of the "X" indicates the magnitude of change the adversarial attack had on the pixel. In an exemplary embodiment of the system 100, the first mapping module 130 can be configured to execute the method of block 208.

In an exemplary embodiment, the method 200 can include block 210 for determining whether the changes to the one or more units of data of the first input data file 114 to generate the one or more second input data files exceed a first threshold. The first threshold can be based on the intensity or magnitude of changes, e.g., attacks, to the one or more units of data of the first input data file 114 caused by the adversarial attack. The first threshold can be, for example, pre-defined by the machine learning model attack program 126, manually defined by a user of the machine learning model attack program 126, or automatically determined by the machine learning model attack program 126, etc. For example, the first threshold can be set to neglect regions, e.g., one or more units of data, of the first input data file 114 that are slightly attacked, e.g., the smaller "Xs" of the first mapping 150. In an exemplary embodiment of the system 100, the attack determination module 132 can be configured to execute the method of block 210.

Figure 1D:
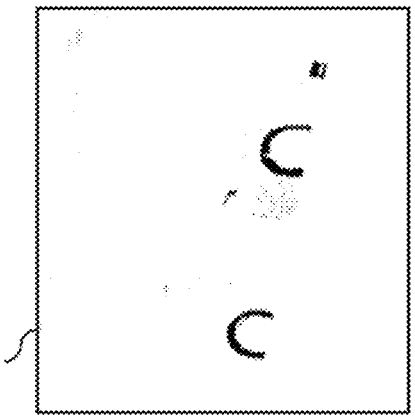
FIG. 1d illustrates an example segmented first input data file in accordance with exemplary embodiments.
Figure 1C:
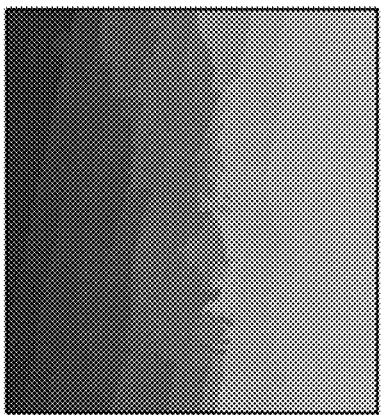
FIG. 1c illustrates an example first mapping showing the one or more units of the first input data file with changes caused by an adversarial attack in accordance with exemplary embodiments.

In an exemplary embodiment, the method 200 can include block 212 for segmenting the one or more units of data of the first input data file 114 into one or more segments as illustrated in FIG. 1d. The segments can be based on one or more characteristics of the first input data file 114 such as, but not limited to, color, intensity, or texture, etc. In an exemplary embodiment, the one or more segments can be groups of pixels of the first input data file 114 that share similar characteristics. In an exemplary embodiment of the system 100, the segmentation module 134 can be configured to execute the method of block 212.

Figure 1E:
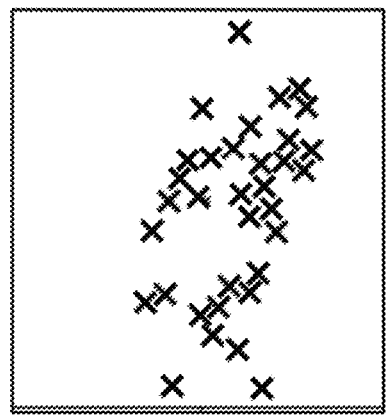
FIG. 1e illustrates the one or more units of the first input data file with changes caused by an adversarial attack exceeding a first threshold.

In an exemplary embodiment, the method 200 can include block 214 for creating a second mapping 152 of the one or more units of data of the first input data file 114 with changes exceeding the first threshold, as illustrated in FIG. 1e, to the one or more segments of the first input data file 114, as illustrated in FIG. 1d. For example, the second mapping 152 can include the one or more segments represented by the large "Xs" of the first mapping 150. In an exemplary embodiment of the system 100, the second mapping module 136 can be configured to execute the method of block 214.

Figure 1F:
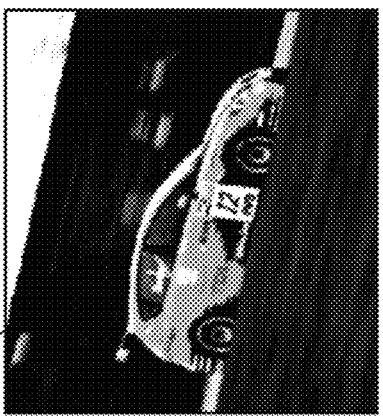
FIG. 1f illustrates an example second mapping showing the density of changes to the first input data file in accordance with exemplary embodiments.

In an exemplary embodiment, the method 200 can include block 216 for determining a density of the changes to the one or more units of data in each of the one or more segments of the first input data file 114 in the second mapping 152. For example, the second mapping 152 of FIG. 1f illustrates a density of changes to the pixels, e.g., the one or more units of data, to the first input data file 114 of FIG. 1b. In an exemplary embodiment of the system 100, the density determination module 138 can be configured to execute the method of block 216.

Figure 1G:
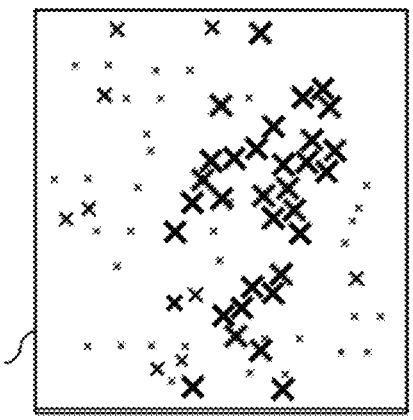
FIG. 1g illustrates a model explanation showing segments of first input data file with density changes exceeding a threshold in accordance with exemplary embodiments.

In an exemplary embodiment, the method 200 can include block 218 for displaying the one or more segments of the first input data file 114 having a density of changes to the one or more units of data exceeding a second threshold via a graphical user interface 142. The one or more segments displayed can represent the one or more segments of the first input data file 114 used by the decision process of the machine learning model 112 to generate the first output data file. For example, FIG. 1g illustrates a model explanation 144 showing the segments of first input data file 114 of FIG. 1b with density changes exceeding the second threshold. Further, the machine learning model attack program 126 can display a natural language description of the one or more units of data exceeding a second threshold via the graphical user interface 142 using any well-known natural language processing technique. For example, referring to FIG. 1g, the machine learning model attack program 126 can display a description of the segments exceeding the second threshold such as "tires" and "front fender" that lead the machine learning model 112 to classify the first data input file 114 as a "race car." In an exemplary embodiment of the system 100, the display module 140 can be configured to execute the method of block 218.

A person having ordinary skill in the art would appreciate that embodiments of the disclosed subject matter can be practiced with various computer system configurations, including multi-core multiprocessor systems, minicomputers, mainframe computers, computers linked or clustered with distributed functions, as well as pervasive or miniature computers that can be embedded into virtually any device. For instance, one or more of the disclosed modules can be a hardware processor device with an associated memory.

A hardware processor device as discussed herein can be a single hardware processor, a plurality of hardware processors, or combinations thereof. Hardware processor devices can have one or more processor "cores." The term "non-transitory computer readable medium" as discussed herein is used to generally refer to tangible media such as a memory device.

Various embodiments of the present disclosure are described in terms of an exemplary computing device. After reading this description, it will become apparent to a person skilled in the relevant art how to implement the present disclosure using other computer systems and/or computer architectures. Although operations can be described as a sequential process, some of the operations can in fact be performed in parallel, concurrently, and/or in a distributed environment, and with program code stored locally or remotely for access by single or multi-processor machines. In addition, in some embodiments the order of operations can be rearranged without departing from the spirit of the disclosed subject matter.

A hardware processor, as used herein, can be a special purpose or a general purpose processor device. The hardware processor device can be connected to a communications infrastructure, such as a bus, message queue, network, multi-core message-passing scheme, etc. An exemplary computing device, as used herein, can also include a memory (e.g., random access memory, read-only memory, etc.), and can also include one or more additional memories. The memory and the one or more additional memories can be read from and/or written to in a well-known manner. In an embodiment, the memory and the one or more additional memories can be non-transitory computer readable recording media.

Data stored in the exemplary computing device (e.g., in the memory) can be stored on any type of suitable computer readable media, such as optical storage (e.g., a compact disc, digital versatile disc, Blu-ray disc, etc.), magnetic tape storage (e.g., a hard disk drive), or solid-state drive. An operating system can be stored in the memory.

In an exemplary embodiment, the data can be configured in any type of suitable database configuration, such as a relational database, a structured query language (SQL) database, a distributed database, an object database, etc. Suitable configurations and storage types will be apparent to persons having skill in the relevant art.

The exemplary computing device can also include a communications interface. The communications interface can be configured to allow software and data to be transferred between the computing device and external devices. Exemplary communications interfaces can include a modem, a network interface (e.g., an Ethernet card), a communications port, a PCMCIA slot and card, etc. Software and data transferred via the communications interface can be in the form of signals, which can be electronic, electromagnetic, optical, or other signals as will be apparent to persons having skill in the relevant art. The signals can travel via a communications path, which can be configured to carry the signals and can be implemented using wire, cable, fiber optics, a phone line, a cellular phone link, a radio frequency link, etc.

Memory semiconductors (e.g., DRAMs, etc.) can be means for providing software to the computing device. Computer programs (e.g., computer control logic) can be stored in the memory. Computer programs can also be received via the communications interface. Such computer programs, when executed, can enable computing device to implement the present methods as discussed herein. In particular, the computer programs stored on a non-transitory computer-readable medium, when executed, can enable hardware processor device to implement the methods illustrated by FIGS. 2 and 4, or similar methods, as discussed herein. Accordingly, such computer programs can represent controllers of the computing device.

Where the present disclosure is implemented using software, the software can be stored in a computer program product or non-transitory computer readable medium and loaded into the computing device using a removable storage drive or communications interface. In an exemplary embodiment, any computing device disclosed herein can also include a display interface that outputs display signals to a display unit, e.g., LCD screen, plasma screen, LED screen, DLP screen, CRT screen, etc.

It will be appreciated by those skilled in the art that the present disclosure can be embodied in other specific forms without departing from the spirit or essential characteristics thereof. The presently disclosed embodiments are therefore considered in all respects to be illustrative and not restrictive. The scope of the disclosure is indicated by the appended claims rather than the foregoing description and all changes that come within the meaning, range, and equivalence thereof are intended to be embraced therein.

What is claimed is:

1. A method for explaining a decision process of a machine learning model, the method comprising:
   inputting into a machine learning model a first input data file, the first input data file having one or more units of data;
   receiving a first output data file from the machine learning model based on the first input data file, wherein the first output data file has a first output determined by a decision process of the machine learning model;
   executing an adversarial attack on the machine learning model, the adversarial attack generating one or more second input data files and inputting the one or more second input data files into the machine learning model to produce one or more second output data files, wherein the adversarial attack changes one or more units of data of the first input data file to generate the one more second input data files;
   creating a first mapping of the one or more units of data of the first input data file changed by the adversarial attack to generate the one more second input data files;
   determining whether the changes to the one or more units of data of the first input data file to generate the one more second input data files exceed a first threshold, the first threshold based on the intensity of changes to the one or more units of data of the first input data file;
   segmenting the one or more units of data of the first input data file into one or more segments based on one or more characteristics of the first input data file;
   creating a second mapping of the one or more units of data of the first input data file with changes exceeding the first threshold to the one or more segments of the first input data file;
   determining a density of the changes to the one or more units of data in each of the one or more segments of the first input data file in the second mapping; and
   displaying the one or more segments of the first input data file having a density of changes to the one or more units of data exceeding a second threshold via a graphical user interface.

2. A method as in claim 1 wherein the machine learning model is a trained computer vision model.

3. The method as in claim 1, wherein the first input data file is an image file and the one or more units of data of the first input data file is one or more pixels.

4. The method as in claim 1, wherein the adversarial attack is a fast gradient sign method (FGSM) attack.

5. The method as in claim 1, wherein the one or more segments displayed represent the one or more segments of the first input data file used by the decision process of the machine learning model to generate the first output data file.

6. A system for identifying the decision process of a machine learning model, the system comprising:
   a processor configured to input into a machine learning model a first input data file, the first input data file having one or more units of data;
   the processor configured to receive a first output data file from the machine learning model based on the first input data file, wherein the first output data file has a first output determined by a decision process of the machine learning model;
   an attack module configured to execute an adversarial attack on the machine learning model, the adversarial attack generating one or more second input data files and inputting the one or more second input data files into the machine learning model to produce one or more second output data files, wherein the adversarial attack changes one or more units of data of the first input data file to generate the one more second input data files;
   a first mapping module configured to create a first mapping of the one or more units of data of the first input data file changed by the adversarial attack to generate the one more second input data files;
   an attack determination module configured to determine whether the changes to the one or more units of data of the first input data file to generate the one more second input data files exceed a first threshold, the first threshold based on the intensity of changes to the one or more units of data of the first input data file;
   a segmentation module configured to segment the one or more units of data of the first input data file into one or more segments based on one or more characteristics of the first input data file;
   a second mapping module configured to create a second mapping of the one or more units of data of the first input data file with changes exceeding the first threshold to the one or more segments of the first input data file;

a density determination module configured to determine a density of the changes to the one or more units of data in each of the one or more segments of the first input data file in the second mapping; and a display module configured to display the one or more segments of the first input data file having a density of changes to the one or more units of data exceeding a second threshold via a graphical user interface.

7. The system as in claim 6, wherein the machine learning model is a trained computer vision model.

8. The system as in claim 6, wherein the first input data file is an image file and the one or more units of data of the first input data file is one or more pixels.

9. The system as in claim 6, wherein the adversarial attack is a fast gradient sign method (FGSM) attack.

10. The system as in claim 6, wherein the one or more segments displayed represent the one or more segments of the first input data file used by the decision process of the machine learning model to generate the first output data file.

11. A computer program product for identifying the decision process of a machine learning model, the computer program product comprising:

a computer-readable storage medium having program instructions embodied therewith, the program instructions executable by a computer to cause the computer to perform a method, comprising:

inputting into a machine learning model a first input data file, the first input data file having one or more units of data;

receiving a first output data file from the machine learning model based on the first input data file, wherein the first output data file has a first output determined by a decision process of the machine learning model;

executing an adversarial attack on the machine learning model, the adversarial attack generating one or more second input data files and inputting the one or more second input data files into the machine learning model to produce one or more second output data files, wherein the adversarial attack changes one or more units of data of the first input data file to generate the one more second input data files;

creating a first mapping of the one or more units of data of the first input data file changed by the adversarial attack to generate the one more second input data files;

determining whether the changes to the one or more units of data of the first input data file to generate the one more second input data files exceed a first threshold, the first threshold based on the intensity of changes to the one or more units of data of the first input data file;

segmenting the one or more units of data of the first input data file into one or more segments based on one or more characteristics of the first input data file;

creating a second mapping of the one or more units of data of the first input data file with changes exceeding the first threshold to the one or more segments of the first input data file;

determining a density of the changes to the one or more units of data in each of the one or more segments of the first input data file in the second mapping; and displaying the one or more segments of the first input data file having a density of changes to the one or more units of data exceeding a second threshold via a graphical user interface.

12. The computer program product as in claim 11, wherein the machine learning model is a trained computer vision model.

13. The computer program product as in claim 11, wherein the first input data file is an image file and the one or more units of data of the first input data file is one or more pixels.

14. The computer program product as in claim 11, wherein the adversarial attack is a fast gradient sign method (FGSM) attack.

15. The computer program product as in claim 13, wherein the one or more segments displayed represent the one or more segments of the first input data file used by the decision process of the machine learning model to generate the first output data file.

* * * * *